United States Patent
Rackley, III et al.

(10) Patent No.: US 11,068,958 B1
(45) Date of Patent: Jul. 20, 2021

(54) SYSTEM AND METHOD FOR OPTIMIZING THE FINANCIAL AND OPERATIONAL PERFORMANCE OF SHARED AUTOMOTIVE FLEET ASSETS FOR A VEHICLE PROVISIONING SERVICE

(71) Applicant: CLUTCH TECHNOLOGIES, LLC, Atlanta, GA (US)

(72) Inventors: Brady L Rackley, III, Atlanta, GA (US); John R Phelps, Jr., Atlanta, GA (US); Adam J Carley, Atlanta, GA (US); Vincent G Zappa, Atlanta, GA (US); Steven S Neel, Suwanee, GA (US); Sangameswar Venkatraman, Atlanta, GA (US); Patrick S McHugh, Atlanta, GA (US); Frank L Wilson, IV, Atlanta, GA (US); Lowell G Hays, Atlanta, GA (US)

(73) Assignee: Clutch Technologies, LLC, Atlanta, GA (US)

( * ) Notice: Subject to any disclaimer, the term of this patent is extended or adjusted under 35 U.S.C. 154(b) by 839 days.

(21) Appl. No.: 15/658,007

(22) Filed: Jul. 24, 2017

(51) Int. Cl.
*G06Q 30/06* (2012.01)

(52) U.S. Cl.
CPC ..... *G06Q 30/0631* (2013.01); *G06Q 30/0645* (2013.01)

(58) Field of Classification Search
None
See application file for complete search history.

(56) References Cited

U.S. PATENT DOCUMENTS

| | | | | |
|---|---|---|---|---|
| 6,975,997 B1* | 12/2005 | Murakami | .............. | B60L 53/65 705/5 |
| 9,080,529 B1* | 7/2015 | Klughart | .............. | F02D 41/2467 |
| 2003/0171962 A1* | 9/2003 | Hirth | ................ | G06Q 10/06315 705/7.25 |
| 2007/0087756 A1* | 4/2007 | Hoffberg | .............. | G06Q 20/065 455/450 |
| 2007/0173993 A1* | 7/2007 | Nielsen | ................... | G07C 5/085 701/33.4 |
| 2007/0282495 A1* | 12/2007 | Kempton | ................ | B60L 55/00 701/22 |
| 2011/0128118 A1* | 6/2011 | Gilleland | ................ | B60R 25/24 340/5.2 |
| 2011/0270486 A1* | 11/2011 | Stevens | ................ | G07C 5/0816 701/31.4 |
| 2013/0024060 A1* | 1/2013 | Sukkarie | ................ | G01C 21/26 701/22 |
| 2013/0232027 A1* | 9/2013 | Reich | ................. | G06Q 30/0631 705/26.7 |

(Continued)

OTHER PUBLICATIONS

Said et al., "Utilizing Telematics Data to Support Effective Equipment Fleet-Management Decisions: Utilization Rate and Hazard Functions", Journal of Computing in Civil Engineering/vol. 30 Issue 1—Jan. 2016 (Year: 2016).*

*Primary Examiner* — Thomas L Mansfield
(74) *Attorney, Agent, or Firm* — Smith Tempel Blaha LLC; Matthew T. Hoots

(57) ABSTRACT

In a subscription vehicle system that enables customers to select and swap between a fleet of available vehicles, the fleet of vehicles are evaluated to determine if the fleet is optimized in view of target metrics and if the fleet can be improved by introducing other assets, removing assets or trading assets.

20 Claims, 4 Drawing Sheets

(56) References Cited

U.S. PATENT DOCUMENTS

| | | | |
|---|---|---|---|
| 2014/0052499 A1* | 2/2014 | Wagner | G07C 5/008 |
| | | | 705/7.36 |
| 2015/0242944 A1* | 8/2015 | Willard | G06Q 30/0284 |
| | | | 705/5 |
| 2016/0253924 A1* | 9/2016 | Kwak | G09B 19/167 |
| | | | 701/123 |
| 2017/0068917 A1* | 3/2017 | Rackley | G06Q 10/06313 |
| 2018/0191867 A1* | 7/2018 | Siebel | H04L 67/32 |
| 2020/0258018 A1* | 8/2020 | Brady | G06Q 10/08 |

* cited by examiner

SYSTEM AND METHOD FOR OPTIMIZING THE FINANCIAL AND OPERATIONAL PERFORMANCE OF SHARED AUTOMOTIVE FLEET ASSETS FOR A VEHICLE PROVISIONING SERVICE

CROSS-REFERENCE TO RELATED APPLICATIONS

This application incorporates the following applications by reference in their entirety:

U.S. application Ser. No. 15/267,144 filed on Sep. 16, 2016 and bearing the title of SYSTEM AND METHOD FOR SCORING THE FIT OF A VEHICLE FOR A GIVEN FLIP REQUEST;

U.S. application Ser. No. 15/267,150 filed on Sep. 16, 2016 and bearing the title of LEARNING AGENT THAT FACILITATES THE EXECUTION OF A SUBSCRIPTION VEHICLE SERVICE BY DYNAMICALLY GENERATING MESSAGES AND PROCESSING RESPONSES TO GENERATE AND AUGMENT DATA THAT CAN THEN BE USED IN SUGGESTIONS TO CUSTOMERS;

U.S. application Ser. No. 15/267,145 filed on Sep. 16, 2016 and bearing the title of LEARNING AGENT THAT FACILITATES THE EXECUTION OF A SUBSCRIPTION VEHICLE SERVICE BY IDENTIFYING VEHICLE SUGGESTIONS OR SUGGESTIONS THAT A CUSTOMER SWAP BASED ON DYNAMICALLY GATHERED INFORMATION;

U.S. application Ser. No. 15/267,148 filed on Sep. 16, 2016 and bearing the title of SYSTEM AND METHOD FOR ALLOCATING VEHICLES ACROSS A POOL OF CUSTOMERS IN A SUBSCRIPTION VEHICLE SERVICE;

U.S. application Ser. No. 15/187,243 filed on Jun. 20, 2016 and bearing the title of SYSTEM AND METHOD FOR DYNAMIC INSURANCE COVERAGE IN A SUBSCRIPTION VEHICLE SERVICE;

U.S. application Ser. No. 15/187,494 filed on Jun. 20, 2016 and bearing the title of SYSTEM AND METHOD FOR DYNAMIC INSURANCE COVERAGE IN A SUBSCRIPTION VEHICLE SERVICE;

U.S. application Ser. No. 14/847,881 filed on Sep. 8, 2015 and bearing the title of SYSTEM AND METHOD FOR MANAGING RISKS AND SCHEDULING OPERATIONS FOR A SERVICE OFFERING SUBSCRIPTION VEHICLE ACCESS; and United States Provisional Application for Patent No. 62/046,813 filed on Sep. 5, 2014 and bearing the title of SYSTEM AND METHOD FOR CONTROLLING RISKS, ADMINISTERING ASSETS, AND SCHEDULING OPERATIONS FOR A SERVICE OFFERING SUBSCRIPTION VEHICLE ACCESS.

BACKGROUND

This application is related to the field of vehicle selections and allocations for various types of services, including but not limited to subscription vehicle services and, more particularly, to optimizing the fleet or domain of vehicles available for use in such services. As one may appreciate, there are several industries or services that rely upon having a fleet, domain or pool of vehicles available for usage. A few examples include subscription vehicle services, test drive services, loans of vehicles or pay-as-you-go use of supplementary vehicles (in effect, vehicle rental), taxi or ride sharing services, large companies providing vehicles to employees, etc. In a subscription vehicle service system, members are able to switch from one vehicle to the next based on their individual wants, desires, needs, etc. Each time a member requires a new vehicle, this is referred to as a flip or swap request. The United States Patent Applications incorporated by reference herein above describe various inventive details and functionality that can be utilized in a subscription vehicle service. However, to sustain the operation of a subscription vehicle service, it is imperative to balance out a variety of factors to maintain profitability and sustainability. The monumental task of collecting, analyzing and interpreting the vast amount of information, variables and status necessary to optimize the financial and operational performance of subscription vehicle system and/or the shared automotive fleet assets of a subscription vehicle service is beyond the scope of human activity.

Therefore, there is a need in the art for a system and method that can optimize such financial and operational performance.

SUMMARY OF THE DISCLOSURE

The present disclosure presents various embodiments, including features, functions and aspects of a method, engine and system configured to optimize a fleet or domain of vehicles within a service or business that relies upon the availability or use of such fleet or domain of vehicles, including but not limited to a vehicle provisioning system and a subscription vehicle system. In an exemplary embodiment, the system includes a data collector configured to collect data pertaining to the current state of a vehicle fleet within a subscription vehicle service. The data collector is configured to collect one or more types of data from various sources including, but not limited to, metrics pertaining to assets currently within the fleet, inclination data pertaining to customers of the subscription vehicle system, operational data pertaining to the subscription vehicle system, valuation data for assets currently within the fleet, valuation data for potential assets to add to the fleet, manufacturing data pertaining to assets currently within the fleet and manufacturing data pertaining to potential assets to add to the fleet. The system further includes a processor configured to analyze the collected data to identify available and/or potential changes to the vehicle fleet. The system further includes a decisioning module configured to select identified changes that optimize the vehicle fleet and an execution module configured to initiate the implementation of the selected changes. The processor analyzes the collected data by determining the financial impact associated with an asset being included in the fleet and/or the operational impact associated with an asset being included in the fleet. The operational impact associated with an asset being included in the fleet includes at least, but is not limited to, the overall profitability, member satisfaction, and vehicle utilization. Further, the decisioning module is configured to select identified changes that optimize the vehicle fleet by comparing all fleet configurations with identified changes and then selecting the configuration that optimizes the fleet performance in view of the targets set. These and other embodiments, functions and features are further described in connection with the below-identified drawings.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same Figure. The specific letter character designation "N" or "n" is meant to indicate that the particular element is not limited to any specific quantity. Letter character designations for reference numerals may be omitted when it is intended that a reference numeral to encompass all parts having the same reference numeral in all Figures.

DETAILED DESCRIPTION

Figure 1:
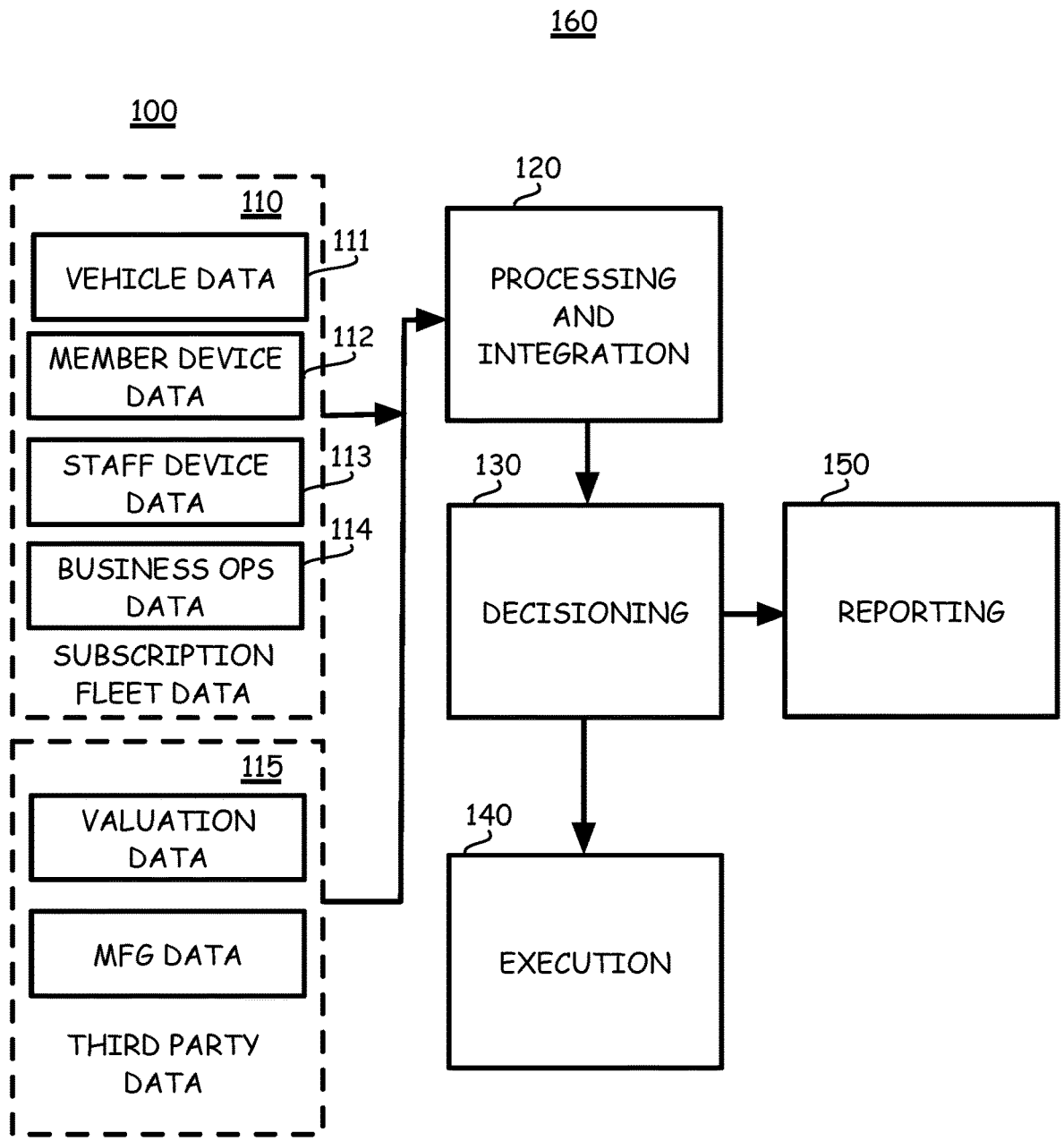
FIG. 1 is a functional block diagram showing exemplary functions that may be included in various embodiments of the Fleet Optimization Engine may operate.

The present application presents embodiments, as well as features, aspects, functionality, etc., of a system and method for optimizing the financial and operational performance of a fleet of automotive assets for a service such as but not limited to a subscription vehicle service. It is clear that oftentimes the main decision driving factors when an individual is selecting a vehicle for purchase is related to utility and/or functionality. This tendency is apparent in both personal and commercial vehicle purchases. Thus, at the time of purchase, the typical buyer identifies the utilitarian needs for which a vehicle is being sought, and then weighs the choice in vehicle selection against those needs and the costs. Frequently, the main factors driving the timing of a vehicle purchase is specific events that trigger utilitarian needs. For instance, the birth of a first child, second child, fifth child, etc. Other non-limiting examples may include a change in a job, relocation to a different climate, taking on a new hobby or sport, or the like.

However, it can be appreciated that the specific needs that may arise and that may result in the triggering of a vehicle purchase may be fleeting, periodic, a periodic, temporary, transitional, etc. For instance, the utilitarian needs that triggered the purchase of a vehicle and drove the decision factors for that purchase may soon be rendered insignificant in the face of other needs that may arise or the original needs may diminish over time and/or in response to other events. And thus, purchased vehicles may be disposed of, such as being resold or traded, at arbitrary points of time in the future; however, due to the typical cost associated with frequent purchasing and trading of vehicles, it can become a costly endeavor to change vehicles out frequently.

The financially astute and prudent consumer, be it for personal use or commercial use, can analyze an overall cost to own and operate vehicles. The overall cost to own and operate a vehicle can be viewed in the short term but, typically, the cost factor is viewed over a period of time, such as a one to three year period. Looking at the vehicle cost over such a longer period of time helps to normalize the cost factor or to minimize the effect of any one factor on the vehicle valuation. Daily, weekly, and even monthly data about usage and market dynamics is only used to the extent that it impacts macroeconomic trends.

It is because of these issues and other issues that there is an increasing shift in mobility that is moving towards a new relationship, one of the subscriber and a shared pool of vehicles. The present disclosure focuses on an environment of a comprehensive technology platform that is used to manage the complexities of delivering "subscription access", which allows consumers to access a pool of vehicles to fit their current transportation wants and needs. In the operation of a subscription access businesses, fleet managers are required to assemble shared fleets to meet a broad spectrum of consumer demands, requiring effective buying and selling of vehicles. To manage these decisions, managers must understand a wide array of data points about the expected consumer demands, the future-looking valuation of each vehicle, and cost to own each vehicle in order to 1) understand the current profitability of each asset, 2) understand how different scenarios impact the value of the assets, and 3) the when, where and how to buy and/or sell vehicles effectively to maximize the performance of the portfolio.

The present disclosure presents embodiments of, and describes various aspects, features and functionalities of a vehicle subscription system that is able to assess and present information pertaining to the current and/or projected profitability of each asset; assess how different scenarios impact the profitability of the assets as well as defined operational metrics; determine optimal or improved schedules for buying and/or selling assets that will positively impact or optimize the operation metrics of the system and to facilitate trades with third parties to support these decisions.

As all computing systems, the solution presented herein can be viewed as a state machine that receives certain inputs and produces deterministic outputs based on the received inputs. The system and method presented here in generally operates to monitor fleet financial and operational performance and orchestrate the trading actions on vehicles in a subscription pool by collecting and processing data from distributed sensors, devices, databases and third party resources. The various embodiments of the system and method are referred to herein as a Fleet Optimization Engine or FOE.

In one embodiment, the inputs can be classified as internal inputs and external or third party provided inputs. In an exemplary embodiment, the internal inputs may include: (a) vehicle sensor data, such as mileage, maintenance, usage metrics (such as determining how fast the vehicle has been driven, hard stops, fast accelerations, aggressiveness of driving habits, frequency and speed of turns, vehicle loading, diagnostic trouble codes (DTC), trip distances and frequency, etc.), (b) data on the vehicle's condition collected by external sensors installed in the vehicle inspection facility (e.g., sensors mounted in the floor that measure tire tread depth and alignment; or cameras that can identify damage, corrosion or dirt by capturing images that can be analyzed using computer vision and machine learning technologies), (c) member device data including vehicle possession, ratings, requests, desires, schedules, etc., (d) staff device data including records from in-person inspections of vehicle condition, maintenance, vehicle possession, vehicle scheduling, vehicle transport, etc., (e) data from vendors who provide vehicle cleaning, maintenance and/or repair services, and (f) revenue and expense data such as maintenance and labor expenses, subscription revenue, etc.

In addition, the external or third party supplied inputs may include: (a) valuation data such as wholesale auction data, retail price listings data, trade-in value, consumer-to-consumer and/or consumer-to-business and/or business-to-business current valuations, etc., (b) valuation forecasts such as residual value forecasts, etc., (c) vehicle item data such as make, model, trim packages interior and/or exterior, options, parts availability, reliability, etc., (d) data on current and forecast inventory of each variety of vehicle sold, including production schedules for new vehicles, inventory currently being distributed with manufacturer's supply chains, inventory on dealer's lots, and vehicles currently leased but due to become available for sale, (e) historical and forecast velocity of sales and leases for each variety of vehicle, both for the overall industry and for any dealership or auction facilities controlled by the entity running the subscription service, (f) measures and forecasts pertaining to economic activity such as gross domestic product, employment rates and interest rates.

FIG. 1 is a functional block diagram showing exemplary functions that may be included in various embodiments of the Fleet Optimization Engine may operate. It will be appreciated that not all of the functionality is necessarily presented in FIG. 1 and, that some embodiments may only utilize a subset of the illustrated functionality. It should also be appreciated that the functional breakdown is for illustrative purposes only and does not necessarily illustrate a production breakdown of the functionality. Thus, each of the functions illustrated may reside in a single software application running on a single processor or may be multiple applications, modules and/or systems in a distributed network, as well as a hybrid of various other configurations.

The functionality of the FOE 160 can be broken down in five categories: (1) Data Collection 100, (2) Processing and Integration 120, (3) Decisioning 130, (4) Reporting 140 and (5) Execution 150.

Data Collection

The first functional area of the FOE is the collection of data. It should be appreciated that the more data and the better the quality of the data received has a direct impact on the performance of the FOE. As such, the various embodiments of the FOE will be receptive to a variety of different data sources, some of which may be redundant but enable data verification and integrity, and some of which may be superfluous in some circumstances but yet useful in other circumstances. Thus, the FOE may collect data from a variety of sensors, devices, and database feeds to capture the underlying variables needed to assess the current and future value the fleet. In the illustrated embodiment, two types of data sources are presented: (1) Subscription Fleet Data 110 and (2) Third Party Data 115. However, it will be appreciated that a wide variety of other characterizations and categorizations could be used to describe the input data and the illustrated embodiment is presented only as an example.

The Subscription Fleet Data 110 may include, as illustrated in the exemplary functional diagram, Vehicle Data 111 or Vehicle Usage Data. The Vehicle Data 111 may include the following items, as well as those listed elsewhere herein, but is not limited to, metrics such as the mileage on the vehicle, the mileage logged per time period, the distribution of the mileage, the type of mileage (city, highway, hybrid), the fuel efficiency, usage patterns, maintenance events, diagnostic trouble codes, etc. The Vehicle Data 111 can be collected via telematics hardware and sensors embedded in subscription fleet vehicles (whether gathered through sensors that were installed when the vehicle was originally manufactured or through telematics devices installed subsequent to manufacturing) as well as applications and/or hardware that may be operating on member's personal computing devices (PCD) and that are associated with particular vehicles. Further, information collected using a member's device may also be loaded into and stored in on-vehicle memory or transmitted to a system accessible database. As an example, a smart phone may include an accelerometer and an application that may provide geospatial information, velocity, acceleration, driving analysis, etc. Similarly, telematics hardware and/or software operating within the vehicle may also provide similar information. All of this information may be collected and used in real time and/or stored within memory on the vehicle or a database for later utilization and analysis.

The Subscription Fleet Data 110 may also include Member Device Data 112. The Member Device Data 112 may generally be described as data that is indicative of the inclinations or propensities of customers of the subscription vehicle system as well as potential customers. The Member Device Data 112 may thus include, but is not limited to member ratings, member requests, and vehicle utilization. The Member Device Data 112 may be collected through one or multiple sources including but not limited to: applications and/or hardware that may be operating on member's personal computing devices (PCD), telematics hardware, in-vehicle API transmission, and internal databases. For instance, the member's PCD may be a smart phone that stores a wide variety of member information including calendars, propensities, interests, travel patterns, etc.

The Subscription Fleet Data 110 may also include Staff Device Data 113 and/or Business Ops Data 114. Such information may generally be referred to as Operational Data and may include any information that is indicative of the efficiency, cost and profitability of the subscription vehicle system as well as records from in-person inspections of past and present vehicle condition, maintenance, vehicle possession, vehicle scheduling, vehicle transport. Thus, the Staff Device Data 113 may include Operational Data collected from equipment operated by staff or operators of the subscription vehicle system and Business Ops Data 114 may include Operational Data collected from the system or otherwise. Without regards to the source, the Operational Data may include, but is not limited to, revenue and operating cost data, including but not limited to subscription payments, maintenance expenses, and labor expenses will be collected via applications on staff and member PCDs as well as accounting/finance databases of the subscription company.

Another type of data source may be provided from Third Party Data 115. Examples of such data may include Valuation Data 116 and Manufacturing Data 117 and specifically may include, but is not limited to (a) valuation data such as wholesale auction data, retail price listings data, trade-in value, consumer-to-consumer and/or consumer-to-business and/or business-to-business current valuations, etc., (b) valuation forecasts such as residual value forecasts, etc., (c) vehicle item data such as make, model, trim packages interior and/or exterior, options, parts availability, reliability, etc., (d) data on current and forecast inventory of each variety of vehicle sold, including production schedules for new vehicles, inventory currently being distributed with manufacturer's supply chains, inventory on dealer's lots, and vehicles currently leased but due to become available for sale, (e) historical and forecast velocity of sales and leases for each variety of vehicle, both for the overall industry and for any dealership or auction facilities controlled by the entity running the subscription service, (f) measures and forecasts pertaining to economic activity such as gross domestic product, employment rates and interest rates.

Valuation Data 116 relates to the current and/or projected value of an asset. For instance, the Valuation Data 116 may include, but is not limited to, wholesale auction data, retail list prices, and residual forecasts. As an example, this information can be collected from third party data sources through a data licensing agreements.

The Third Party Data 115 may also include Manufacturing Data 117 such as vehicle categorization data, reliability data, maintenance cost, etc. As a non-limiting example, the Manufacturing Data 117 may include vehicle specifications by VIN that can be collected from third party data sources through a data licensing agreement.

The various types of data described, as well as other data, such as in-house historical financial data, can be collected and updated frequently to ensure data processing and the operational decisions accurately reflect the current status of the fleet and the market.

Processing and Integration

The various embodiments of the FOE can analyze and interpret the collected data to determine the expected operation and financial behavior of each vehicle in the subscription fleet. The Processing and Integration 120 function receives the collected data and can feed the data through an algorithm or heuristic engine to provide processed input to the Decisioning Function 130. The output of the Processing and Integration 120 function can be periodic or can be updated in real-time as the Subscription Fleet Data 110 and the Third Party Data 115 is updated and/or modified. The Processing and Integration 120 function, among other things, can thus provide data and advice to the subscription company (individuals or systems) identifying the impacts that may be realized through a series of potential trade options including but not limited to overall profitability, member satisfaction, and vehicle utilization.

The value of vehicles in the fleet can be determined by forecasting future cashflows including, but not limited to, revenues from subscribers, operating costs, and depreciation expenses. Future revenues of the fleet can be estimated based on forecasted utilization of each of the assets in the fleet across all available product offerings and the associated price per utilized period charged to members. Future costs can be forecasted based on projections of all the expenses related to owning the vehicle, including but not limited to anticipated maintenance needs, labor associated with the activities of the vehicle, forecasted insurance payments, and financing costs. Depreciation of each of the assets can be based on the difference between current market values and future residual values, adjusted to reflect the impact on the market value, set at a point in time determined by the system, that can be attributed to the condition and mileage of an asset.

The value of trade options can be estimated based on the forecasted future cash flows of specific vehicles. For instance, if a particular vehicle is being considered to be added to the fleet, the future cash flow for that particular vehicle, as well as impacts to future cash flows of other vehicles in the fleet, can thus be determined. This includes, but is not limited to, the expected cost to acquire the vehicle, the anticipated terminal value of the vehicle, the expected utilization and associated subscription revenues, and all operating costs associated with the vehicle. Specifically for trades, the net impact to the fleet can be determined by comparing the costs and revenues potentially attributable to the acquired asset in view of a forfeited one or more assets.

Decisioning

The results of the data Processing and Integration 120 function may then be processed by the Decisioning 130 function. The functionality of the Decisioning 130 function within an exemplary FOE evaluates the processed data received from the Processing and Integration 120 function and determines the projected status of the fleet. The projected status of the fleet may be measured in view of the executive metrics set by the subscription company and may relate at least to some degree to customer satisfaction and profitability. These metrics, and their relation to the targets set by the subscription company or desired performance metrics, drive the recommended actions for the subscription company, namely what assets need to be purchased, sold and or traded.

Thus, the exemplary FOE can operate to compare all available sourcing options against forecasted performance of each option to determine the actions to be executed in order to optimize the fleets established performance metrics. For instance, the comparison by the FOE can look at the domain of options for the fleet including holding all of the existing vehicles, selling select existing vehicles and/or replacing select existing vehicles with trade-ins. The Decisioning 130 function may also incorporate constraints including but not limited to member satisfaction, vehicle variety, and the number of vehicles per category.

Reporting

The various embodiments of the FOE may include a Reporting 150 function to report the results of the Decisioning 130 function. The Reporting 150 function can be machine readable data that can be used to drive the functionality of a computer or may be a report to provide recommendations or instructions to an individual or team to implement. The Reporting 150 function can provide a wide variety of information and a typical Reporting 150 function can provide:

(1) current financial position of each vehicle within the fleet as well as the aggregate fleet and or groupings of the fleet;

(2) the set of new acquisitions, trades and disposals needed to maximize the performance of the fleet in view of achieving the desired operational metrics for the subscription business including:

(a) units to be sold and acquired (b) timeline to execute transactions (3) the financial impacts to the value of the fleet for any given set of trades (4) the operational impacts to the value of the fleet for any given set of trades Execution The various embodiments of the FOE may include an Execution 140 function that operates to take actions for adjusting the fleet inventory to maximize the performance of the system in view of the desired operation metrics. The Execution 140 function preferably operates in conjunction with the vehicle scheduling system or the fleet status function of a subscription vehicle system (more fully described in connection with FIG. 2) to ensure that units flagged to be sold are not in the possession of members or are not moved into maintenance where additional expense would unnecessarily incur.

Thus, the FOE may automatically and/or autonomously initiate and cause the execution of vehicle sales, acquisitions and trades or may simply provide instructions to a user interface to enable an operator, such as a fleet manager to perform such actions.

In the autonomous mode, the FOE may interface with third party systems or operators to facilitate a marketplace for buying, selling, and trading subscription vehicles between a subscription fleet and third parties. Further, the FOE may interact with OEMs and dealers to align demand with production and ordering cycles. Thus, if the FOE were to determine that a specific model or a specific grouping of vehicles are necessary to optimize the system, the FOE can identify the number of such vehicles expected to be rolled out of the manufacturing facility over a particular period of time. If the number is not sufficient, then the FOE can provide requests to the manufacturer to focus efforts on particular models with a guaranteed purchase projection.

The FOE may include an interface to existing vehicle marketplaces to process transactions and identify target inventory to be sourced into the fleet. For instance, the FOE may interface with auction houses, manufactures, dealers and the like to ascertain future expected inventories that can be acquired and options for off-loading other vehicles.

Subscription Vehicle System Description

Figure 2:
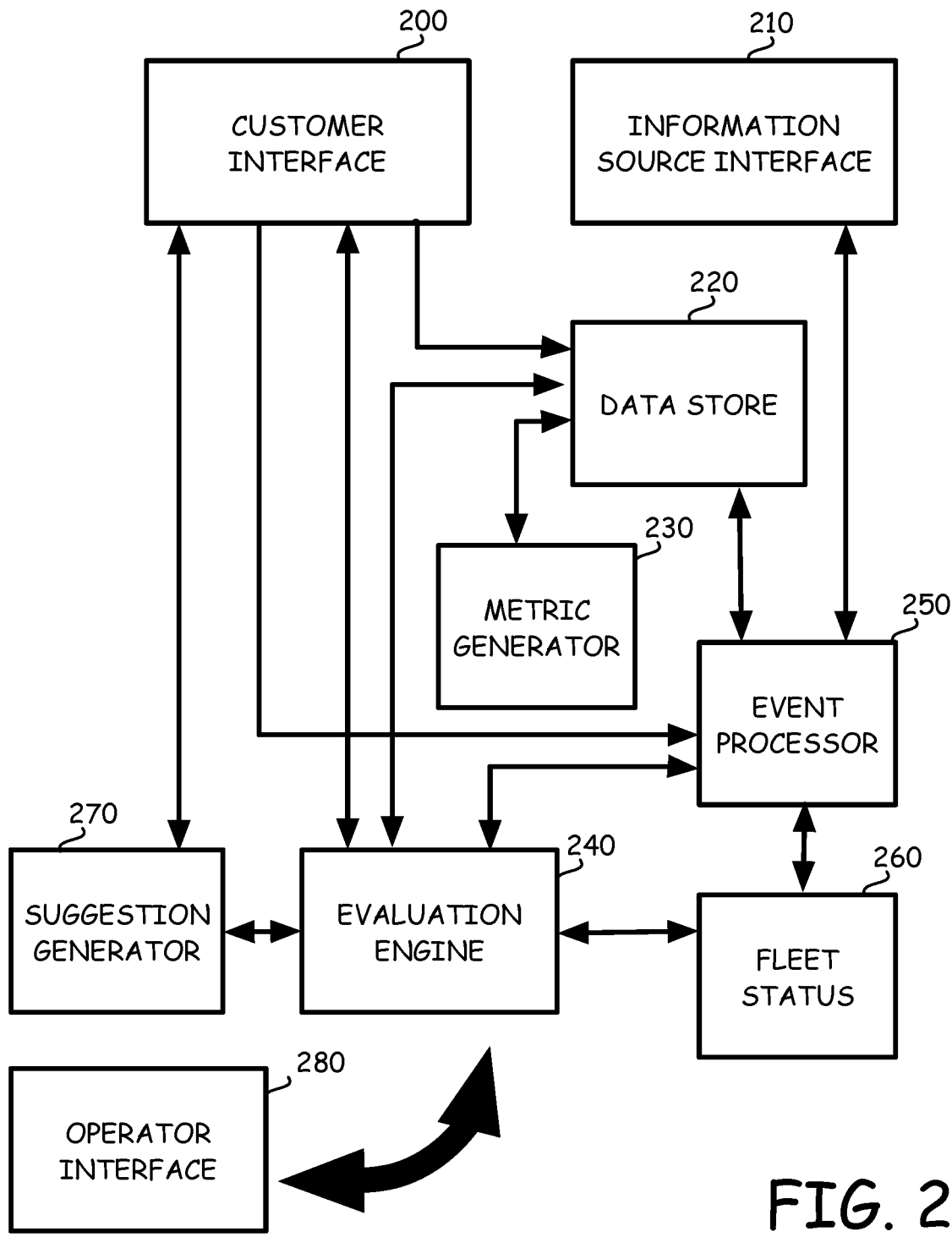
FIG. 2 is a block diagram illustrating functional operations of an exemplary embodiment of subscription vehicle system (SVS) that may operate in conjunction with the FOE.

FIG. 2 is a block diagram illustrating functional operations of an exemplary embodiment of subscription vehicle system (SVS) that may operate in conjunction with the FOE. The details of operation and functionality of various embodiments of an SVS are described in greater detail in the above-incorporated application but, a general overview of the SVS is provided here for convenience. It should be appreciated that the particular breakdown of the various functional blocks is only provided for an overall functional understanding of an exemplary embodiment and is not intended to illustrate an actual structural or architectural restriction on various implementations. For instance, the functionality in one illustrated block may actually be performed or implemented by multiple systems that are geographically dispersed, multiple modules in the same computing system, or multiple software flows in the same executable software element. In addition, functionality that is illustrated in separate blocks may actually be incorporated into the same software or hardware module. Thus, those skilled in the art will appreciate that the presented structure is simply provided to assist in the understanding of the overall functionality of an exemplary embodiment.

The functional block diagram illustrates a customer interface 200 and an information source interface 210. The customer interface 200 enables the SVS to interact with a customer that is registering to utilize the SVS, providing initial information for the creation of the customer and account profile, present vehicle suggestions from the SVS, as well as receive and respond to requests for additional information, provide feedback to the system and interact with the SVS for requesting vehicles and vehicle swaps, as well as a variety of other functionality as is presented in the above-incorporated applications.

The data store 220 is utilized as a database or storage medium for information that is acquired and/or utilized by the SVS. For instance, the initial profile information received through the customer interface 200, as well a augmentations thereto can be stored within the data store 220. In addition, the data store 220 can provide storage for generated metrics, including but not limited to use cases and value attributes, historical interactions such as prior suggestions and responses from the customer to such suggestions, customer feedback, or the like.

The information source interface 210 enables the SVS to interact with external systems, databases or other sources of information to further gather and/or augment the profile information and to obtain other information that can be utilized in the generation of metrics, evaluation of vehicle requests and other events and the generation of vehicle suggestions.

Periodically, the SVS will generate metrics as described in FIG. 1 for the metric generating events 310 and 350. The metric generator 230 receives input from the data store 220 in support of generating the metrics. As previously describe, the metric generator 230 relies not only upon the information in the data store 220 but also a set of algorithms and/or heuristics to analyze the available information for the generation and/or augmentation of value attributes, the generation and/or augmentation of use cases as well as identifying information deficiencies and providing input for generating events to gather further information. The metric generator 230 may also receive input directly from a system operator, the customer interface 200, the information source interface 210 as well as operate in conjunction with the evaluation engine 240 in generating the metrics.

The event processor 250 operates to receive and interpret various events that may be received by or occur in the SVS. The event processor 250 may receive events directly from the customer interface 200, such as a vehicle swap request, feedback, queries regarding vehicle availability, etc. In addition, the event processor may receive events that are triggered by the metric generator 220, the evaluation engine 240, the fleet status 260, the information source interface 210 or any other source or generator of an event in the SVS that needs to be processed. If an event received by the event processor 250 is a request for a vehicle or a vehicle swap, the event processor 250 can operate to trigger the evaluation engine 240 to generate a vehicle suggestion list (see processes 320 and 325 of FIG. 1). If the evaluation engine 240 determines that additional information is required or that additional information may be useful to generate a more optimum vehicle suggestion list, the evaluation engine 240 may trigger a campaign event for obtaining such further information by invoking such an event. The event processor 250 would operate on this event in any of the variety of manners describe in connection with processes 330 and 345 of FIG. 1. The fleet status may also result in triggering various types of events. For instance, as an operator updates the SVS through the operator interface 280, the operator can enter changes to the fleet, such as the addition of new vehicles, removing of sold assets or tagging assets as unavailable due to delivery or maintenance, etc. This information may then result in the generation of events to collect more information, modify information, regenerate metrics, etc.

The operator interface 280 may include a terminal access to the SVS, Internet access, mobile access through a browser or a resident app, messaging, etc. Through the operator interface 280, one or more operators can interact with most elements or functional capabilities of the SVS to provide further input or control. For example, the operator can directly interact with a customer by the operator interface 280 providing direct access to the customer through the customer interface 200. Such access could be in the form of messaging, push notifications, chatting, etc. Through the operator interface 280, the operator may also be able to review the information available in the data store 220, monitor, augment or control the operation of the metric generator 230, directly trigger events for the event processor 250, review/modify/reject vehicle suggestions from the suggestion generator 270, enable/disable/modify the various heuristics/algorithms of the evaluation engine 240, etc.

The evaluation engine 240 primarily analyzes the available data to provide input to the suggestion generator 270 and/or generate events for the event processor 250. The heuristics and algorithms utilized by the evaluation engine 240, as well as the metric generator 230, can be quite varied and are dynamically adjusted. As a previously stated goal of the SVS, customer satisfaction is of significant importance. The customer satisfaction can be measured in a variety of manners and the afore-mentioned value of certainty is only one such measure. Customer surveys, customer retention, expansion of customer base, level of customer interaction, was all as other metrics are all tangible and definable measures that can be used to determine if customer satisfaction is being achieved. Thus, as the system is deployed and operates in the field, new heuristics, rules and algorithms can be developed, deployed and monitored to see if the customer satisfaction metrics are beneficially or adversely affected. Based on these results, additional changes may also be implemented. In addition, the ability for customers to provide free from entry of information can also be used to generate and/or modify the heuristics, rules and algorithms. As a non-limiting example, the SVS can detect a trend of customers providing queries with regards to the miles per gallon ratings for vehicles, the volume of the gas tanks and the fuel efficiency. If such requests tend to be at a heightened level of frequency from customers that are swapping out for vehicles for long trips, the SVS may modify the operation of the evaluation engine to identify the number of miles that a vehicle or a class of vehicles will average between having to stop for refueling. As such, the heuristics may operate to generate a value attribute associated with the average distance between refueling then include consideration of other parameters, such as schedule, type of use (vacation or business trip), etc., as well as the new value attribute in evaluation a vehicle change request. It should also be appreciated that the artificial intelligence aspect of the SVS can be used to provide valuable information to the SVS operator. For instance, if the distance between fueling value attribute is trending towards a heightened level of importance, the SVS can provide operator notice to evaluate an expansion or modification of the fleet to include an increased number of vehicles with higher distance between refueling parameters or, modify some of the existing or upcoming expansions to the fleet to include auxiliary fuel tanks.

The FOE of FIG. 1 operates in conjunction with the SVS of FIG. 2. The FOE and the SVS may be highly integrated, may be stand-alone systems or any hybrid of the two extremes. Functionally, the FOE would interface to the operation of the SVS by at least accessing the Fleet Stats 260 functionality and information.

Figure 3:
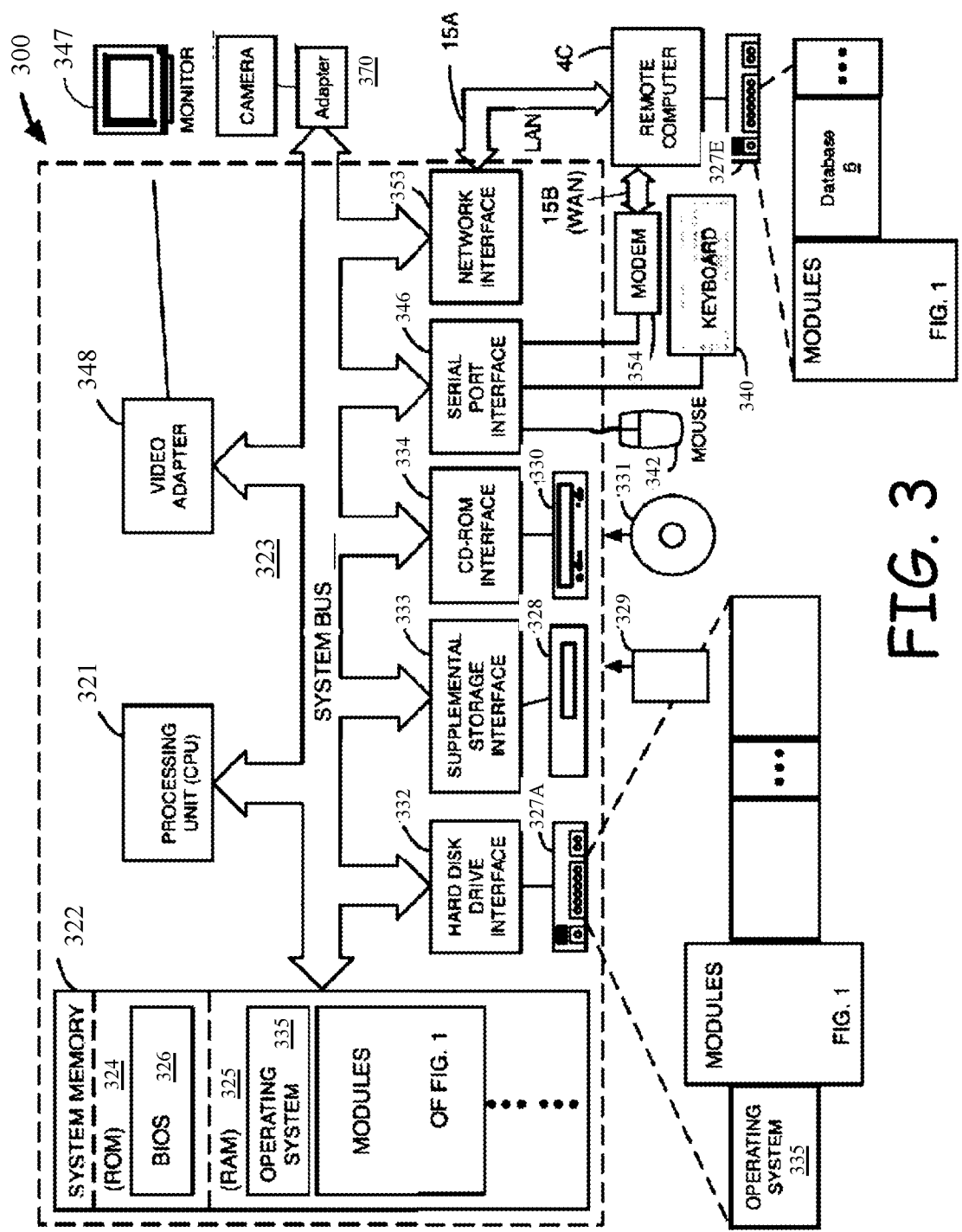
FIG. 3 is a block diagram of an exemplary environment or platform suitable for implementing various functions, modules, subsystems or the FOE.

FIG. 3 is a block diagram of an exemplary environment or platform suitable for implementing various functions, modules, subsystems or the FOE. In the illustrated embodiment, the computing system, or server 300, may comprise a processing unit 321, a system memory 322, and a system bus 323 that couples various system components including the system memory 322 to the processing unit 321. The system bus 323 may comprise any of several types of bus structures including a memory bus or memory controller, a peripheral bus, and a local bus using any of a variety of bus architectures. The system memory may comprises a read-only memory (ROM) 324 and a random access memory (RAM) 325. A basic input/output system (BIOS) 326, containing the basic routines that help to transfer information between elements within computer 320, such as during start-up, is stored in ROM 324.

The server 300 may comprise a hard disk drive 327A for reading from and writing to a hard disk, not shown, a supplemental storage drive for reading from or writing to a removable supplemental storage 329 (like flash memory and/or a USB drive) and an optical disk drive 330 for reading from or writing to a removable optical disk 331 such as a CD-ROM or other optical media. Hard disk drive 327A, magnetic disk drive 328, and optical disk drive 330 are illustrated as being connected to system bus 323 by a hard disk drive interface 332, a supplemental storage drive interface 333, and an optical disk drive interface 334, respectively.

Although the exemplary environment described herein is illustrated as employing hard disk 327A, removable magnetic disk 329, and removable optical disk 331, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet-connected devices such as in a portable devices and/or personal digital assistants (PDAs).

The drives and their associated computer readable media provide nonvolatile storage of computer-executable instructions, data structures, program modules, and other data for computer or client devices. A number of program modules may be stored on hard disk 327, magnetic disk 329, optical disk 331, ROM 324, or RAM 325, including, but not limited to, an operating system 335 as well as various modules and routines as presented in FIG. 2, as well as the various heuristics, algorithms and data. Program modules comprise routines, sub-routines, programs, extendable objects, components, data structures, etc., which perform particular tasks or implement particular abstract data types. Aspects of the present invention may be implemented in the form of a downloadable, client-side, application modules, which are executed by server 300 in order to provide the functionality described herein.

A user may enter commands and information into server 300 through input devices, such as a keyboard 340 and a pointing device 342. Pointing devices may comprise a mouse, a trackball, and an electronic pen that may be used in conjunction with an electronic tablet. Other input devices (not shown) may comprise a microphone, joystick, game pad, satellite dish, scanner, or the like. These and other input devices are often connected to processing unit 321 through a serial port interface 346 that is coupled to the system bus 323, but may be connected by other interfaces, such as a parallel port, game port, a universal serial bus (USB), wireless interface such as WIFI or BlueTooth, or the like. Likewise, the user can enter commands through a browser type interface running on a separate computer, laptop, handheld device, etc., that connects to the server 300 through a LAN 15A, WAN 15B or other interface.

The display monitor 347 may also be connected to system bus 323 via an interface, such as a video adapter 348. The display 347 may comprise any type of display devices such as a liquid crystal display (LCD), a plasma display, an organic light-emitting diode (OLEO) display, and a cathode ray tube (CRT) display.

A camera 375 may also be connected to system bus 323 via an interface, such as an adapter 370. The camera 375 may comprise a video camera such as a webcam. The camera 375 may comprise a CCD (charge-coupled device) camera or a CMOS (complementary metal-oxide-semiconductor) camera. In addition to the monitor 347 and camera 375, other peripheral output devices (not shown), such as speakers and printers may also be communicatively coupled to the server 300.

Server 300 may operate in a networked environment using logical connections to one or more remote computers, such as a web server. A remote computer may comprise another personal computer, such as another server 4C, a portable computing device, a router, a network PC, a peer device, or other common network devices. While the web server 4C or a remote computer typically comprises many or all of the elements described above relative to the server 300, only a memory storage device 327E has been illustrated in FIG. 3. The logical connections depicted in FIG. 3 comprise a local area network (LAN) 15A and a wide area network (WAN) 358. Such networking environments are commonplace in offices, enterprise wide computer networks, intranets, and the Internet.

When used in a LAN networking environment, server 300 is often connected to the local area network 15A through a network interface or adapter 353. When used in a WAN networking environment, server 300 typically comprises a modem 354 or other means for establishing communications over WAN 358, such as the Internet. Modem 354, which may be internal or external, is connected to system bus 323 via serial port interface 346. In a networked environment, program modules depicted relative to the server 4C, or portions thereof, may be stored in the remote memory storage device 327E. It will be appreciated that the network connections shown are exemplary and other means of establishing a communications link between server 300 and other devices may be used.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network (such as communications-network 15A, for example). In a distributed computing environment, program modules may be located in both local and remote memory storage devices.

In one exemplary embodiment, one or more extendable objects, applications, programs, system processes, method steps, etc. of the system of the present disclosure may be stored in the memory 312 as computer program instructions. In one exemplary embodiment related to the functional diagram of FIG. 1, the server 300 may execute, at least partially, one or more of the functional blocks.

Certain steps in the exemplary processes, process flows, and/or methods described herein naturally precede others for the invention to function as described. However, the invention is not limited to the order of the steps described if such order or sequence does not alter the functionality of the system and method of the present disclosure. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in the art of programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer readable medium. Computer-readable media comprise both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of computer-readable media.

Figure 4:
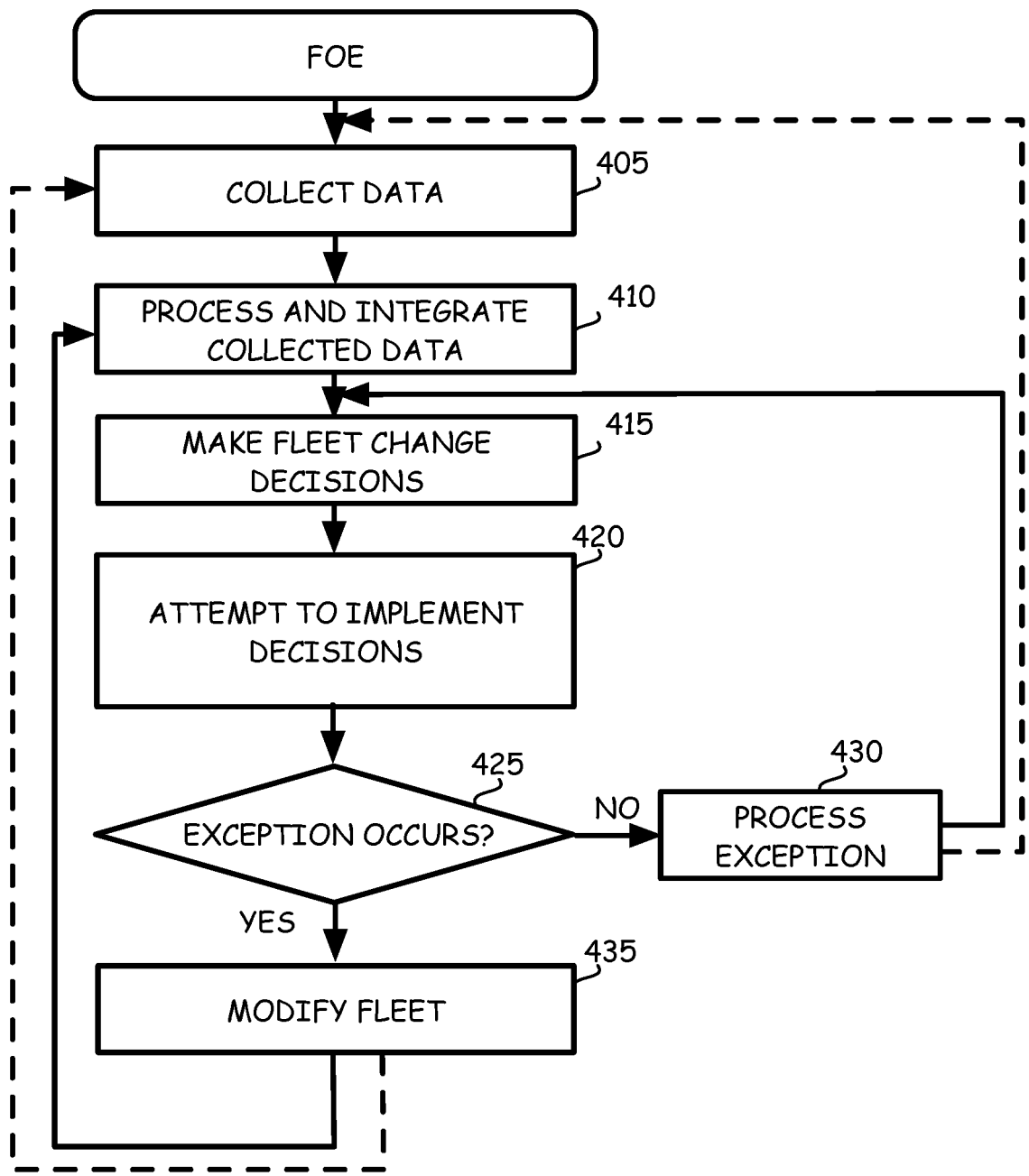
FIG. 4 is a flow diagram illustrating an exemplary method of implementing an exemplary FOE.

FIG. 4 is a flow diagram illustrating an exemplary method of implementing an exemplary FOE. Initially, the FOE collects the data from the various sources as illustrated in FIG. 1 or other sources 405. The FOE then processes and integrates the collected data 410. Once the data has been thus analyzed, the processed data can be used to make fleet change decisions 415. Once the decisions with regards to augmenting the fleet have been made, the FOE can attempt to implement one or more such changes 420. If the attempted change results in an exception 425, then the further processing of a particular change can be rejected or otherwise processed 430 and processing can return to block 415 to make other fleet changes or to block 405 to collect further data. However, if an exception does not occur 425, then the fleet is modified and processing continues with making further fleet changes 415 if any or back to collect data 405.

The exceptions that may occur in attempting to implement a decision can be quite varied. For instance, if the FOE indicates that X number of a particular vehicle model should be purchased, the FOE can reach out to effectuate such purchases. However, if the FOE determines that the vehicles are not available or not available within a required amount of time, then an exception can be triggered. One can appreciate that a wide array of exceptions may occur and the present invention is not limited to any particular exception. However, a few non-limiting examples include, vehicle available but not with desired options, vehicle available but not within required mileage, vehicle available but not within desired price range, etc.

OEM and Dealership Embodiments

The embodiments presented thus far have primarily focused on the optimization of the fleet to support the goals of the subscription business, trading off cost and member satisfaction. In some embodiments, the various aspects presented herein are also applicable to a subscription service that is owned and/or operated by a car dealer, an OEM or other similar entities. In such embodiments and environments, the owner may choose to sub-optimize the returns of the subscription service in order to optimize other parts of the business. For example, a dealer may choose to move units into the subscription fleet in a manner that is sub-optimal for the fleet mix and vehicle-to-member ratio, as identified by the system. The dealer might take such actions for a number of reasons, such as but not limited to:

(a) optimizing new inventory volume for total sales margin;

(b) if the number of units (or a particular type of unit) in the dealership's inventory is (or is expected to be) higher than what the dealer expects to be able to sell at a velocity and/or margin to meet their financial targets, then the dealer might move some of the excess units into the subscription fleet;

(c) if the inventory of new vehicles is lower than optimal (such as when sales have exceeded expectations or when a shipment from the manufacturer has been delayed), the dealership may benefit from higher sales if they had more vehicles, thus the dealer might choose to delay moving vehicles into the subscription fleet or to pull vehicles from the subscription fleet and thus run the subscription business with lower than optimal inventory;

(d) optimizing the inventory mix for sales margin, such as moving vehicles into the subscription fleet to maintain an ideal or preferred mix of vehicles on the dealer lot for sales and moving units can operate to free up capital that can be redeployed to purchase other inventory that can be sold more profitably (e.g., the next model year);

(e) capture a sales volume incentive by purchasing a larger quantity of vehicles than is necessary for the dealership but, that can be moved into the subscription fleet thus allowing the dealer to qualify for a manufacturer's incentive that may be contingent on achieving a sales target;

(f) increase the supply of future used units ("used car factory" concept) by carrying excess inventory in the subscription fleet to subsequently have those units available for sale on the used lot; and (g) increase new vehicle sales volumes by utilizing a larger supply of vehicles in the subscription fleet for long-term test drives and other use cases that support new vehicle sales, thus the dealer might carry excess inventory in the subscription fleet and use the vehicles from the subscription fleet to offer long-term test drives to potential purchasers of vehicles.

Further, in the dealership focused embodiments, the dealer might choose to move units out of the subscription fleet in sub-optimal manners, such as having an adverse impact on the fleet mix and vehicle-to-member ratio. Such actions may be taken by a dealer that is motivated to improve results from selling used cars. More specifically, the dealer may move vehicles out of a fleet for, but not limited to:

(a) optimize used inventory for total sales margin of a used inventory by moving vehicles out of the subscription fleet and into the used inventory at an accelerated or delayed rate;

(b) reduce capital employed in the used inventory a dealer may choose to treat the subscription fleet as a reserve inventory for the used lot, thus allowing the dealer to carry fewer units in their used inventory for sale but having access to pull additional units from the subscription fleet to replaced used units that are sold.

Similarly, these motivations and operations that apply to a dealer owning the subscription service may also apply to an OEM that owns the subscription service. If an OEM were the entity running a subscription service, the OEM may implement the above-presented dealer actions in an effort for their franchise dealers to manage profitability.

In addition, the OEMs might also use subscription as a way to manage the supply of used vehicles coming into the market. For instance, OEMs typically hold back vehicles that are coming off lease to avoid saturating the market. Feeding these vehicles into a subscription service creates a mechanism for them to accomplish this goal yet still leverage the vehicles for income purposes.

Embodiments that Blend Subscription and Complementary Services

The system described thus far has focused on a pool of vehicles used to vehicle subscriptions in a subscription vehicle service. In a further embodiment, a single pool of vehicles could be used to fulfill a variety of additional services provided to subscription holders and to traditional vehicle owners or lessees, including but not limited to: test drives, loans of vehicles or pay-as-you-go use of supplementary vehicles (in effect, vehicle rental). While not changing the fundamental nature of the system, these additional use cases create different patterns of demand, usage and customer satisfaction that should be incorporated into the algorithms that recommend the fleet size and composition, potentially leading to different results.

Buy it Now Feature

In the various embodiments presented herein, business outcomes are optimized, based in large part on the ability to determine the value of a vehicle at any point in its usage in the subscription business. It should be appreciated that other use cases may also benefit from such information. For instance, the value of the vehicle can be converted into an estimated retail value for the vehicle and that value can be presented to a subscription service subscriber. Under this embodiment, it is possible to update the valuation of the vehicle based on a near real-time estimation of its condition, gathered through sensors on the vehicle. For example, mileage data could be gathered directly from the vehicle's odometer or from a combination of the last manual reading of the odometer and an estimate of subsequent miles driven inferred from time stamped GPS coordinates for those trips. Upon receipt of such estimated value, the subscriber can be presented with the offer to "buy it now" using a button within a mobile app providing the subscription service, as well as other mechanisms. Thus, the subscriber may actuate the button to commence the purchase of the vehicle. The service may also take into account other factors, such as perceptions on the subscribers affinity of the car, lack of interest, the level that the vehicle matches with the subscribers profile, et., in determining when and how much to offer.

Definitions

The term "exemplary" is used herein to mean serving as an example, instance, or illustration. Any aspect described herein as "exemplary" is not necessarily to be construed as preferred or advantageous over other aspects.

The term "application" may include files having executable content, such as: object code, scripts, byte code, markup language files, and patches. In addition, an "application" referred to herein, may also include files that are not executable in nature, such as documents that may need to be opened or other data files that need to be accessed.

The term "content" may include files having executable content, such as: object code, scripts, byte code, markup language files, and patches. In addition, "content" referred to herein, may also include files that are not executable in nature, such as documents that may need to be opened or other data files that need to be accessed.

The terms "component," "database," "module", service," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device (a "PCD") may include a cellular telephone, a pager, a PDA, a smartphone, a navigation device, or a hand-held computer with a wireless connection or link.

A "subscription" is an account with the service. A "subscriber" or "client" is a named person who has entered into a contract for service and is listed on the account. A "driver" or "named driver" is a person that has been approved by the service to drive one or more vehicles associated with the account on a habitual basis or for an extended period of time. A subscription may have multiple drivers listed on the account. A subscription account may have one or more vehicles assigned to it at any period in time. Each driver may be approved to drive one, some or all of the vehicles assigned to the account.

A "predictive feature" or "feature" is defined as, in the practice of machine learning and pattern recognition, an individual measurable property of a phenomenon being observed. Choosing informative, discriminating and independent features may be a crucial step for effective algorithms in pattern recognition, classification and regression. Features are usually numeric, but structural features such as strings and graphs are used in syntactic pattern recognition. The concept of a "feature" is related to that of a "dependent variable" (or "explanatory variable") used in statistical techniques such as linear regression.

The term "possession" is used herein to denote the period of time when a vehicle is assigned to a subscriber or client and is in the custodianship of that subscriber or client. This concept is distinct from "rental" for at least the reason that when a vehicle is rented, the amount paid is a function of the time that the subscriber has the car. Under a subscription service, the payment may comprise a flat fee that does not depend on either the duration of possessions or the frequency of swaps.

The present disclosure, which should be viewed with reference to the above-incorporated parent and related applications, generally relates to the provision of a vehicle fit score within a system for and a method of administering assets and scheduling operations for a service offering subscription vehicle access. More specifically, exemplary embodiments relate to a system for and a method of evaluating a vehicle in view of a wide variety of parameters and circumstances to generate a score that is indicative of the fit of a particular vehicle for a particular flip request from a customer.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for a computer system to optimize a domain of vehicles to be utilized within a vehicle provisioning system of a subscription vehicle system, the method comprising the actions of:
   equipping each vehicle in a domain of vehicles utilized by the vehicle provision system with telematic devices that can transmit telematics data;
   providing one or more vehicles in the domain of vehicles to customers of the subscription vehicle system;
   receiving telematics data from one or more of the telematics devices operating within the one or more provided vehicles, the telematics data being reflective of the actual usage of the provided vehicles;
   collecting further data pertaining to the current state of the domain of vehicles within the vehicle provisioning system;
   analyzing the received telematics data and the collected further data to identify available changes to the domain of vehicles;
   selecting identified changes that optimize the domain of vehicles by modifying the domain of vehicles such that the received telematics data is more closely aligned with the collected further data; and
   initiating the implementation of the selected changes.

2. The method of claim 1, wherein the action of collecting data further comprises collecting metrics pertaining to assets currently within the domain of vehicles.

3. The method of claim 2, wherein the action of collecting data further comprises collecting inclination data pertaining to customers of the vehicle provisioning system.

4. The method of claim 3, wherein the action of collecting data further comprises collecting operational data pertaining to the vehicle provisioning system.

5. The method of claim 4, wherein the action of collecting data further comprises collecting valuation data for assets currently within the domain of vehicles.

6. The method of claim 5, wherein the action of collecting data further comprises collecting valuation data for potential assets to add to the domain of vehicles.

7. The method of claim 6, wherein the action of collecting data further comprises collecting manufacturing data pertaining to assets currently within the domain of vehicles.

8. The method of claim 7, wherein the action of collecting data further comprises collecting manufacturing data pertaining to potential assets to add to the domain of vehicles.

9. The method of claim 8, wherein the action of analyzing the collected data further comprises the action of determining the financial impact associated with an asset being included in the domain of vehicles.

10. The method of claim 9, wherein the action of analyzing the collected data further comprises the action of determining the operational impact associated with an asset being included in the domain of vehicles.

11. The method of claim 10, wherein the operational impact associated with an asset being included in the domain of vehicles includes at least one of overall profitability, member satisfaction, and vehicle utilization.

12. The method of claim 11, wherein the action of selecting identified changes that optimize the domain of vehicles further comprises comparing all configurations of the domain of vehicles with identified changes and select the configuration that optimizes the domain of vehicles performance in view of a set of performance metrics that are acceptable.

13. A system configured to optimize a domain of vehicles within a vehicle provisioning system of a vehicle subscription service, the system comprising:
   a domain of vehicles utilized within a vehicle provisioning system, wherein each of vehicles in the domain of vehicles are equipped with a telematics device configured to transmit telematics data pertaining to the vehicle to the vehicle provisioning system, the telematics data being reflective of the actual usage of the vehicles;
   a data collector configured to receive the transmitted telematics data and to collect further data pertaining to the current state of the domain of vehicles utilized by the vehicle provisioning system, at least a portion of the transmitted telematics data being received from vehicles that have been provided to customers;
   a processor configured to analyze the collected data to identify available changes to the domain of vehicles;
   a decisioning module configured to select identified changes that optimize the domain of vehicles by modifying the domain of vehicles such that the received telematics data is more closely aligned with the collected further data; and
   an execution module configured to initiate the implementation of the selected changes.

14. The system of claim 13, wherein the data collector is configured to collect one or more of metrics pertaining to assets currently within the domain of vehicles, inclination data pertaining to customers of the vehicle provisioning system, operational data pertaining to the vehicle provisioning system, valuation data for assets currently within the domain of vehicles, valuation data for potential assets to add to the domain of vehicles, manufacturing data pertaining to assets currently within the domain of vehicles and manufacturing data pertaining to potential assets to add to the domain of vehicles.

15. The system of claim 14, wherein the processor analyzes the collected data by determining the financial impact associated with an asset being included in the domain of vehicles.

16. The system of claim 14, wherein the processor analyzes the collected data by determining the operational impact associated with an asset being included in the domain of vehicles.

17. The system of claim 16, wherein the operational impact associated with an asset being included in the domain of vehicles includes at least one of overall profitability, member satisfaction, and vehicle utilization.

18. The system of claim 13, wherein the decisioning module is configured to select identified changes that optimize the vehicle fleet by comparing all fleet configurations with identified changes and then selecting the configuration that optimizes the fleet performance in view of the targets set.

19. An engine optimizing a fleet of vehicles within a subscription vehicle system, the engine comprising:
   a data collector module configured to:
      receive transmitted telematics data from one or more vehicles within a domain of vehicles utilized within a vehicle provisioning system, wherein a plurality of vehicles in the domain of vehicles are equipped with a telematics device configured to transmit telematics data pertaining to the vehicle and at least a portion of the received telematics data is from vehicles that have been provided to customers for use, the telematics data being reflective of the actual usage of the provided vehicles; and
      collect further data pertaining to the current state of a vehicle fleet within a subscription vehicle system, wherein the collected data includes one or more of metrics pertaining to assets currently within the fleet, inclination data pertaining to customers of the subscription vehicle system, operational data pertaining to the subscription vehicle system, valuation data for assets currently within the fleet, valuation data for potential assets to add to the fleet, manufacturing data pertaining to assets currently within the fleet and manufacturing data pertaining to potential assets to add to the fleet;
   a processor module configured to analyze the collected telematics data and further data to identify available changes to the vehicle fleet;
   a decisioning module configured to select identified changes that optimize the vehicle fleet by modifying the domain of vehicles such that the received telematics data is more closely aligned with the collected further data; and
   an execution module configured to initiate the implementation of the selected changes.

20. The engine of claim 19, wherein the processor module analyzes the collected data by determining the financial impact and the operational impact associated with an asset being included in the fleet and the decisioning module is configured to select identified changes that optimize the vehicle fleet by comparing all fleet configurations with identified changes and then selecting the configuration that optimizes the fleet performance in view of the targets set.

* * * * *